United States Patent [19]

Clymer et al.

[11] 4,082,491
[45] Apr. 4, 1978

[54] AUTOMATED MOLDING MACHINE

[75] Inventors: Wilbur L. Clymer, Phillipsburg, N.J.; Charles J. Klara, Bethlehem, Pa.

[73] Assignee: Binney & Smith Inc., Easton, Pa.

[21] Appl. No.: 650,016

[22] Filed: Jan. 19, 1976

Related U.S. Application Data

[62] Division of Ser. No. 512,545, Oct. 7, 1974, Pat. No. 3,957,408.

[51] Int. Cl.² .................. B29C 5/00; B29C 7/00
[52] U.S. Cl. ........................... 425/440; 425/217; 425/289; 425/444; 425/453; 425/803; 425/DIG. 32; 425/DIG. 201
[58] Field of Search ............ 425/217, 218, 220, 803, 425/261, 453, 317, 440, 444, 455 R, DIG. 32, DIG. 201

[56] References Cited

U.S. PATENT DOCUMENTS

| 3,310,834 | 3/1967 | Simpson et al. | 425/437 X |
| 3,454,988 | 7/1969 | Cremer | 425/435 X |
| 3,957,408 | 5/1976 | Clymer et al. | 425/803 |

*Primary Examiner*—Robert L. Spicer, Jr.
*Attorney, Agent, or Firm*—Norbert P. Holler

[57] ABSTRACT

Machine for making crayons or the like comprising means for supplying fluid material to a series of mold cavities in a horizontally rotatable mold table, means for controlling the temperatures of the cavities, means for ejecting the molding products from the cavities, means for receiving the ejected products and conveying them to one or more delivery points and means for removing excess material from the mold table and recycling it, with suitable controls for operating the several elements according to a desired program and with specific improvements in the apparatus and in the method of operation.

8 Claims, 11 Drawing Figures

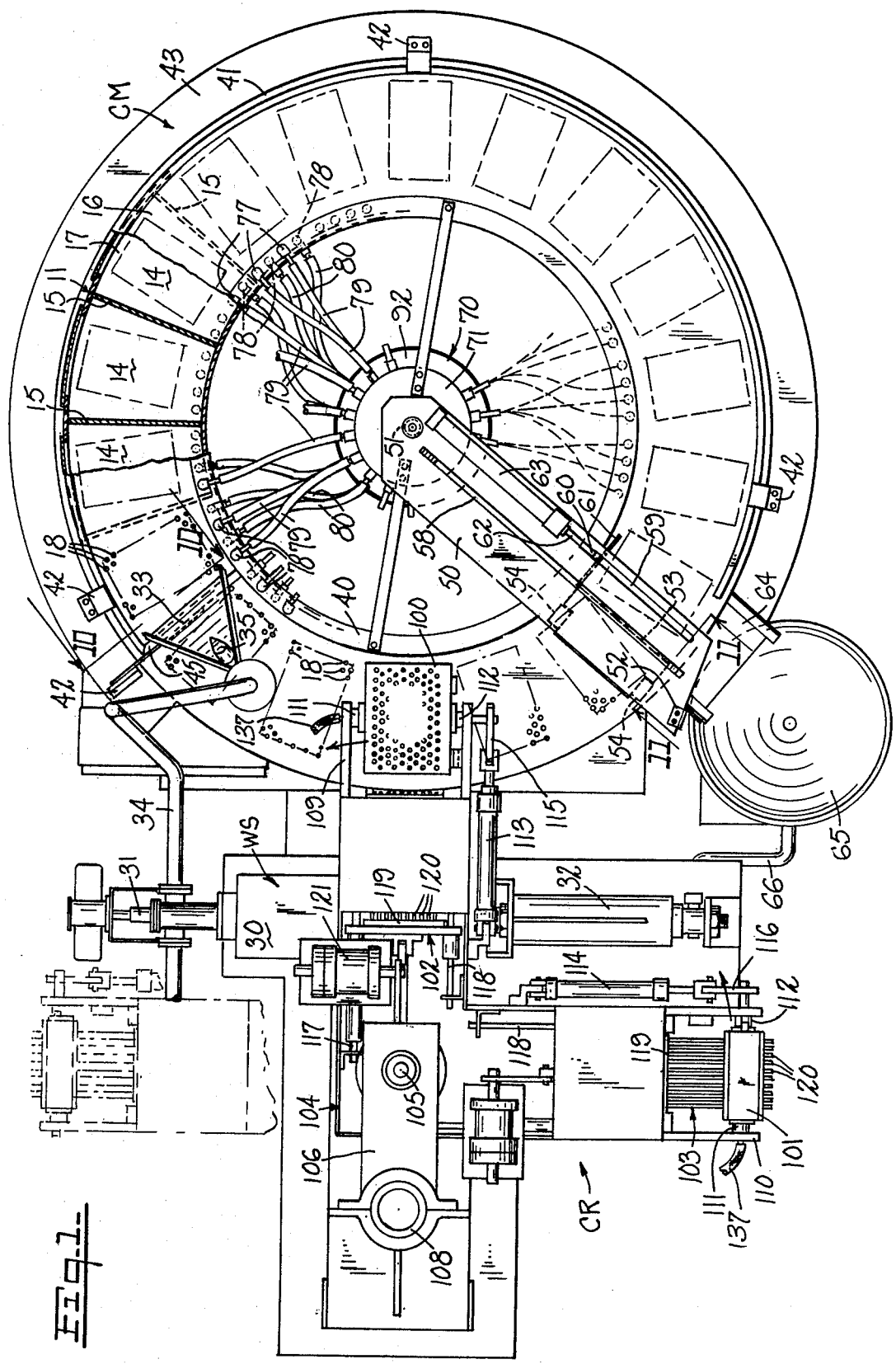

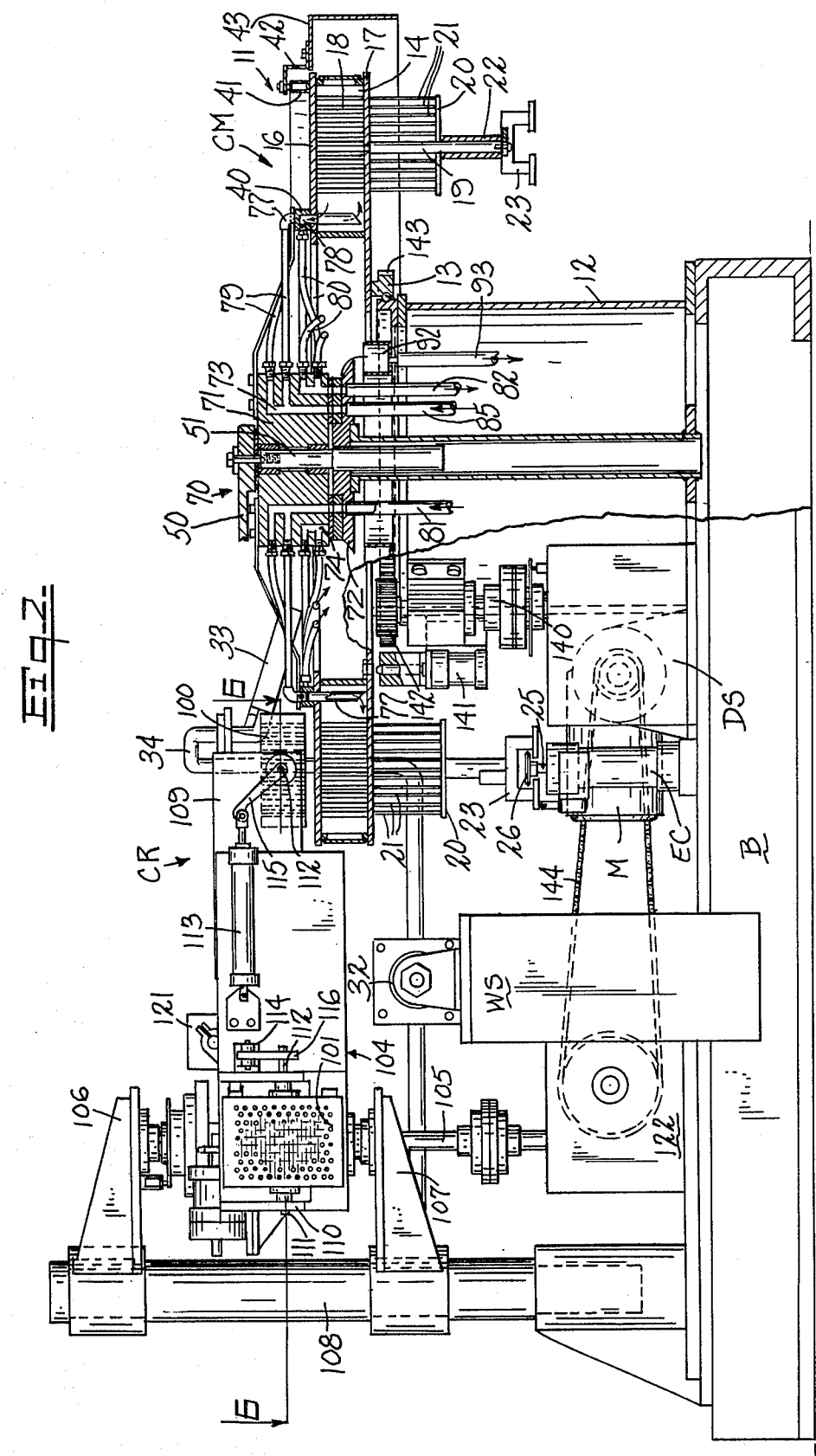

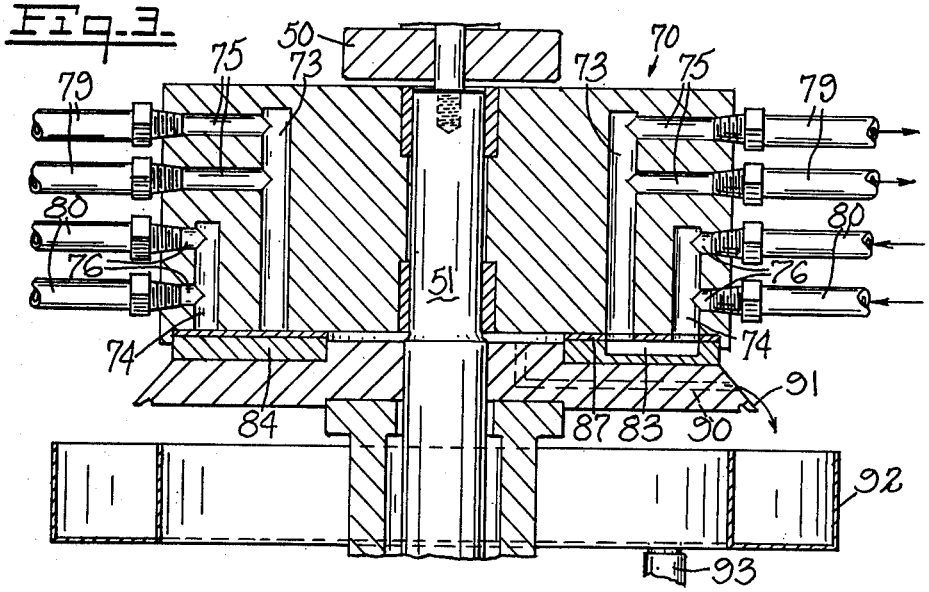
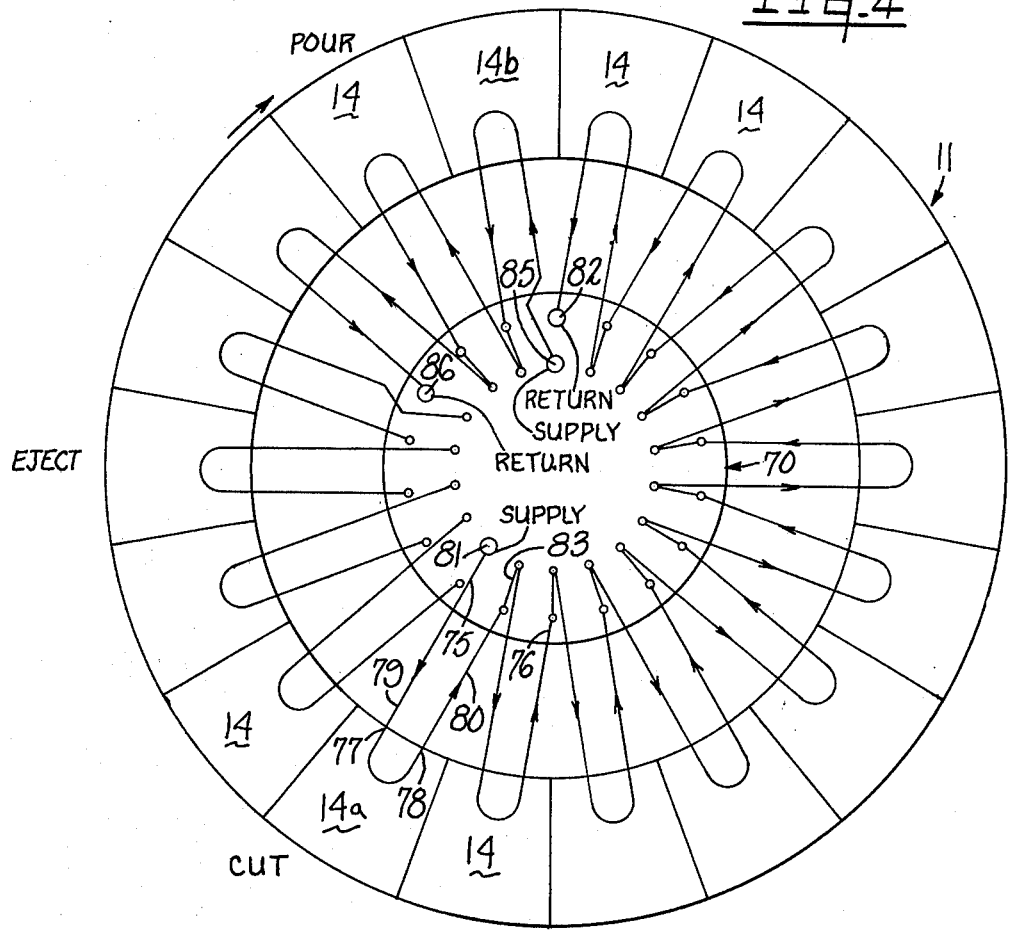

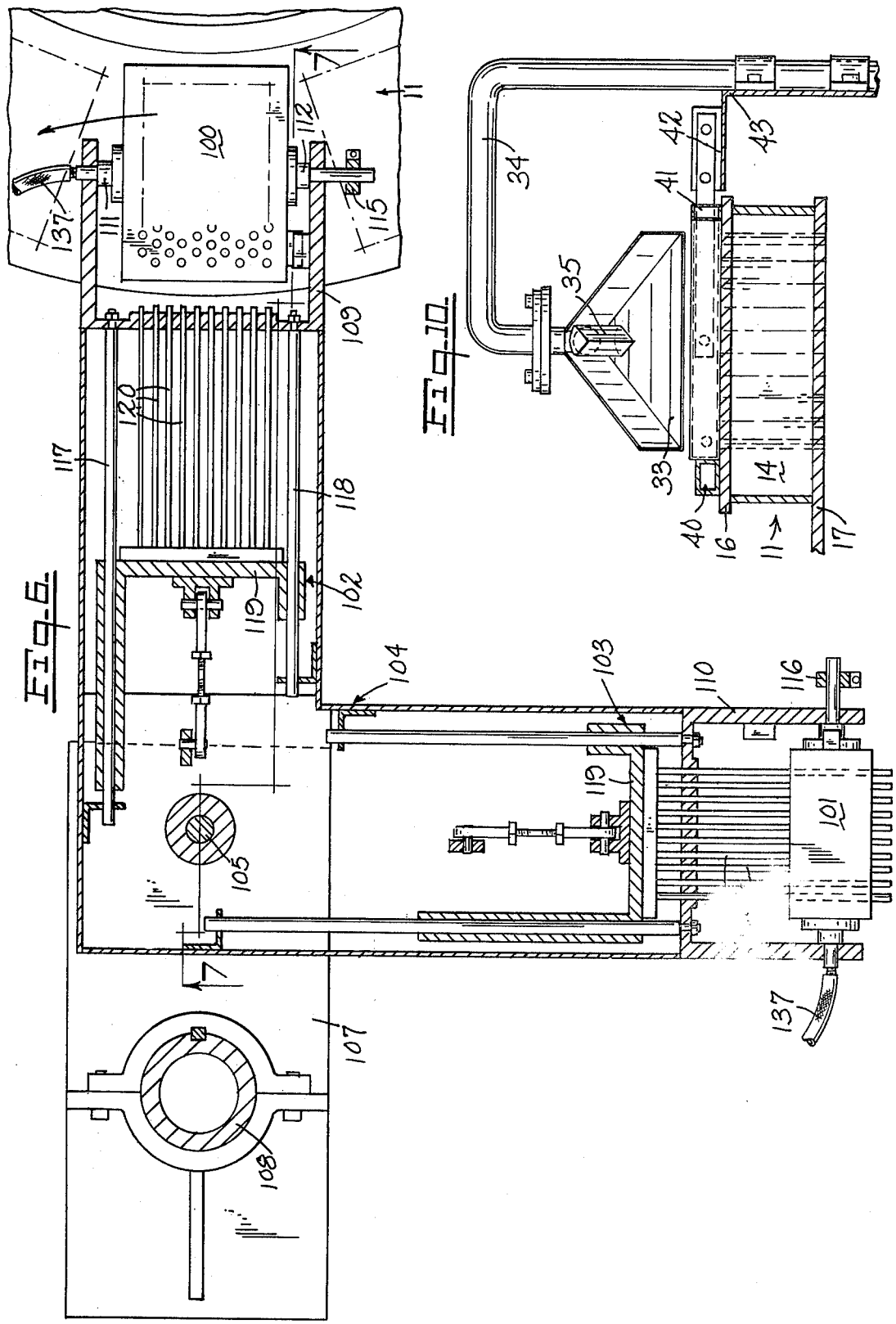

AUTOMATED MOLDING MACHINE

RELATED U.S. APPLICATION

This application is a division of our prior application Ser. No. 512,545 filed Oct. 7, 1974, now U.S. Pat. No. 3,957,408 issued May 18, 1976.

This application relates to molding machines for making crayons or other elongated moldable articles, and more particularly to an automated machine wherein the fluid, liquid or plastic material of the final product is shaped and solidified in mold cavities and then removed therefrom and delivered to a desired point for further handling.

Machines having a series of multi-cavity mold blocks carried on a stationary or movable support have long been known in the prior art. In addition, a rotatable cavity mold, rotatable around a vertical axis and having means for supplying a melted thermoplastic material to the cavities is likewise well known in the prior art. Means for ejecting solidified products from various mold cavities have long been known.

The improvement of the present invention is directed to a molding machine and method for molding crayons and the like wherein there is provided means for supplying material in fluid, liquid or plastic condition to a series of mold cavities in a horizontally rotatable mold table, adjustable means for controlling the temperatures of the cavities at successive stages of their movement, means for ejecting the solidified molded products from the cavities, means for receiving the ejected products and conveying them to one or more delivery points, and means for removing excess material from the mold table and recycling it, together with suitable adjustable controls for operating the several elements according to a desired program. The machine products are referred to herein as "crayons" with the understanding that the machine can be adapted to the manufacture of other elongated moldable articles.

In view of the foregoing it is an object of the present invention to provide a new molding machine having improved means for supplying fluid material to the mold cavities.

It is another object to provide a new molding machine with particularly effective means for adjustably controlling the temperature of the mold cavities at successive stages in the method.

It is a further object to provide new and improved means for receiving the molded objects in a controllably resilient receiver for transfer to one or more delivery stations.

It is a still further object to provide means for removing excess material from the vicinity of the mold cavities and recycling it for re-use in the apparatus and method.

It is a still further object to provide certain improvements in the form, construction, arrangement and materials of the machine, and in the steps of its method of use, whereby the above-named and other objects may effectively be attained. The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the invention, reference is had to the following description taken in connection with the accompanying drawings, wherein:

FIG. 1 represents a top plan view of the machine;

FIG. 2 represents a side elevation of the machine, with parts of the mold table and its associated parts being broken away and shown in vertical section;

FIG. 3 is an enlarged view in axial vertical section of the water manifold of the invention;

FIG. 4 is a schematic flow diagram of the water circulation system;

FIG. 6 is a horizontal section of the receiving and conveying means, taken along line 6—6 of FIG. 2;

FIG. 10 is a vertical section taken along line 10—10 of FIG. 1 and showing the liquid material delivery means.

Figure 5:
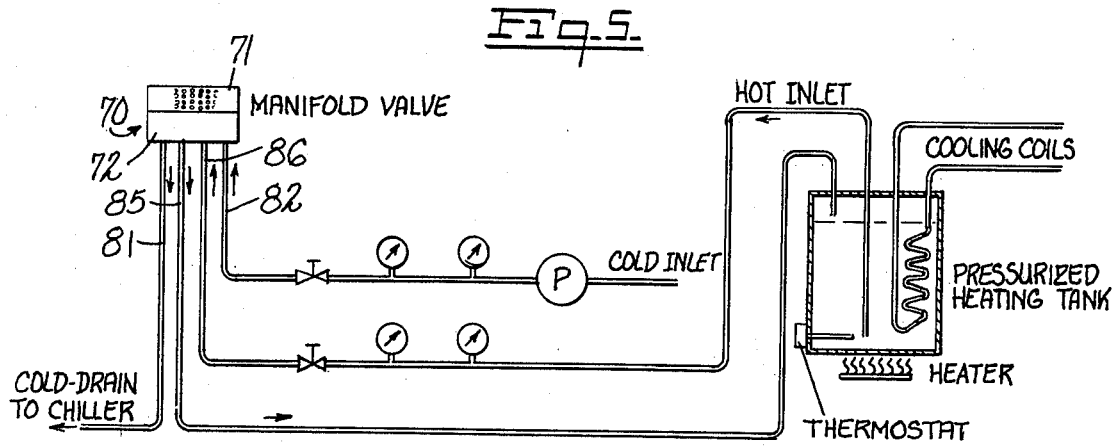
FIG. 5 is a diagrammatic view of the conduits and controls for regulating the temperatures of certain parts of the machine.

Referring to the drawings, the machine comprises a base B, on which are mounted a crayon molding system CM, a crayon removal system CR, a wax supply system WS, an ejector cylinder EC and a drive system DS.

The crayon molding system includes the mold table 11 rotatably supported on the fixed housing 12 by the gear bearing 13. The mold table consists of a plurality (eighteen being shown) of integral compartments 14, separated by vertical walls 15 between upper and lower annular plates 16, 17. In each compartment are mounted a multiplicity of vertical mold tubes 18, (e.g., 110) each being slightly tapered to facilitate removal of the crayons.

An ejector support rod 19 projects downward beneath each compartment and carries a plate 20 on which are mounted an array of ejector point stems 21 (one for each mold tube), each having a recessed head closing the bottom of its respective mold tube. The plates 20 are fixed on sleeves 22, slidable on the rods 19, and each sleeve carries a yoke 23 for cooperation with the piston of the ejector cylinder, as described below. The heads of the point stems 21 are recessed in order to form the tapered points of the crayons (bottom of FIG. 9).

The ejector cylinder EC is mounted on the machine base and is provided with a piston 25 carrying a shoe 26 which is adapted to engage in each yoke 23, as the mold table advances, so that actuation of the cylinder can lift the ejector assembly and remove the crayons from the tubes.

The wax supply system WS includes an adjustable volume wax pump 30 connected to an air operated three-way valve 31 which connects to the crayon melt supply system 32 and to the sprue discharge chute 33, by means of pipe 34. All the components except the air cylinder operator are heated, as by low pressure steam tubing or electric heating elements, in order to keep the wax hot and fluid. The discharge chute is triangular in plan with a flow spreader 35 adjacent its apex and with its lower edge disposed near the surface of the upper plate 16 of the mold table. The chute has a width slightly greater than the radial width of the mold tube arrays, so that wax delivered by the chute will flow into each tube.

The upper plate 16 carries, adjacent its inner periphery, a water conduit supporting ring 40 traversed vertically by four inlet or outlet passages for each of the eighteen compartments. The ring 40 constitutes a wall defining the inner side of a channel, the outer side of which is defined by the chill ring 41, mounted by brackets 42 on the skirt 43 which is supported adjacent the periphery of the mold table by legs (not shown). The chill ring terminates up-stream (with respect to the movement of the mold cavities) in a radially disposed dam 45 beneath the chute 33 and extends about 240° around the machine to a point adjacent the scraper, serving to solidify hot wax which may contact it and thus to contain the wax on the table surface as the table rotates.

Figure 11:
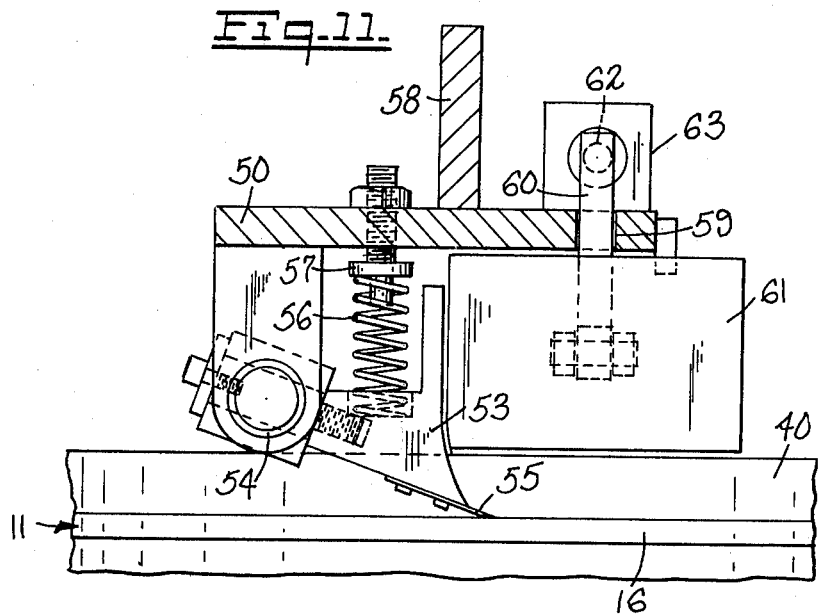
FIG. 11 is a vertical section taken along line 11—11 of FIG. 1, showing the excess material removing means.
Figure 7:
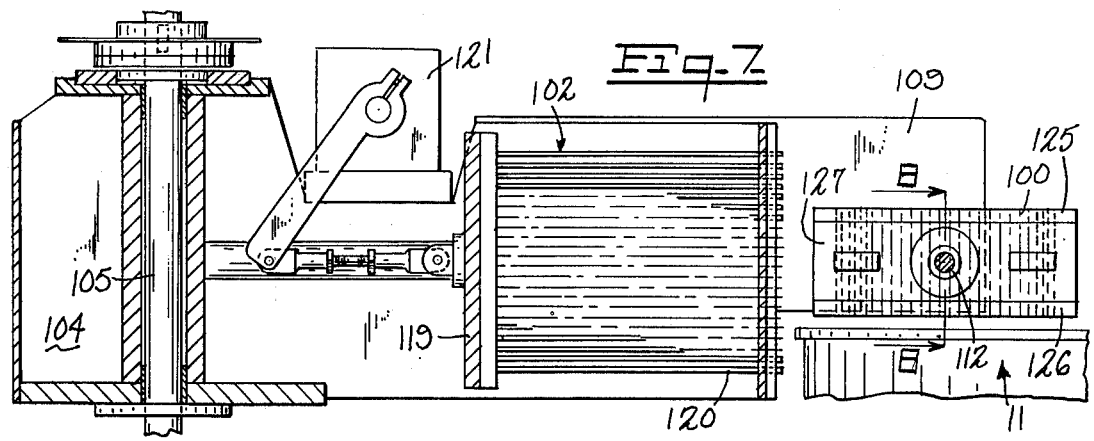
FIG. 7 is a vertical section taken along line 7—7 of FIG. 6.

The wax scraper system (FIGS. 1 and 11) comprises a radially disposed arm 50 fixed at one end to the top of a center post 51 and supported at its other end by a bracket 52, the scraper 53 itself being pivotally mounted in radially aligned bushings 54 beneath the arm 50 and having its blade 55 held firmly against the surface of the plate 16 by a spring 56, the force of which can be adjusted by means of nut 57. The arm 50 is reinforced by a rib 58 and is slotted at 59 to receive the carrier 60 for a paddle 61 which is connected to the rod 62 of an air cylinder 63 mounted on the arm. The edge of the paddle adjacent the scraper is shaped to match the profile of the scraper, and the paddle is designed to reciprocate radially in order to push excess wax ploughed up by the scraper outward onto an inclined chute 64 above the remelt kettle 65. This kettle is heated to liquify the wax and return it through the pipe 66 to the crayon melt supply system.

The mold table compartments 14 are heated or cooled by water supplied through a water manifold 70 mounted on the center post 51. The manifold consists of a rotating member 71 that rotates with the table and which is connected by hoses to each compartment and a fixed member 72 to which the supply and return hoses are connected. The member 71 is a cylindrical block bored from the bottom to provide a first vertical bore 73 and a second vertical bore 74, radially outward from the first bore, for each of the compartments 14. Two short horizontal passages 75 intersect the bore 73 and two more short passages 76 intersect the bore 74, providing a total of four openings for connection to each compartment, according to a pattern to be described. Connections to the respective compartments are made through inlet or outlet passages 77, 78 in the distributing ring 40, the two upper passages 75 from a given bore 73 being connected to tubes 79 for delivery of water near the bottom of a first compartment, and the two lower passages 76 from the corresponding radially aligned bore 74 being connected by tubes 80 to outlets 78 in the top of a second compartment, next downstream from the first compartment, with respect to the direction of rotational movement of the compartments.

The heating and cooling pattern is shown diagrammatically in FIG. 4, which may be considered as superimposed on the mold table of FIG. 1, with certain supply and return connections being shown in FIG. 2. According to a typical program, cold water is supplied through conduit 81 to a compartment 14a from which the water flows through each successive compartment, in a counter-clockwise direction, to the return conduit 82, slightly more than 180° removed from conduit 81.

At each of the intermediate compartments the bores 73 and 74 are in register with a radial channel 83 in the annular bearing plate 84 a respective transfer passage in the form of the manifold member 72 (FIG. 3), thus completing an open circuit from supply conduit 81 to return conduit 82. Adjacent the conduit 82 is a supply conduit 85 for hot water which enters compartment 14b and is conducted counter-clockwise through a few (e.g., three) compartments to a return conduit 86 (FIG. 4). Between the conduits 86 and 81, as indicated at the left of FIGS. 3 and 4, the plate 84 has neither holes nor channels so that no water flows through the compartments as they pass through this zone. The plate 84 and the corresponding sealing plate 87 on the bottom surface of the member 71, being subjected to relative rotary movement, may permit some leakage of water, which is taken care of by means of the drain passage 90 and beveled outer edge 91 on the fixed member 72, in cooperation with a trough 92 and waste pipe 93.

Hot and cold water are supplied to the conduits 85 and 81 from sources which include suitable heating and cooling means and the manifold 70, by means of which hot and cold water can be directed as desired through the compartment circulation systems. FIG. 5 illustrates diagrammatically certain of the components of the water supply. According to the scheme of FIG. 4, three compartments are heated by the flow between conduits 85 and 86 as they pass through the "POUR" zone, under chute 33, so that the wax will fill the tubes 18 without solidifying too soon or wrinkling. The following 11 compartments are cooled by the counter-current flow of cold water from conduit 81 to conduit 82, the water being coldest when it enters the compartment 14a, and the crayons being thus thoroughly solidified when they are cut off square at their ends in the "CUT" zone by the scraper 53 and subsequently ejected. In the neutral "EJECT" zone neither heat nor cold is supplied, the next phase being the beginning of another cycle in the "POUR" zone; chilling in the "EJECT" zone might promote condensation in the tubes 18 which would adversely affect the filling of the tubes with wax.

The crayon removal system CR, or carrier, comprises two primary receivers 100, 101, two ejectors 102, 103 and an L-shaped carrier frame 104 which is mounted on a vertical axle 105 between brackets 106, 107 on a post 108, supported by the machine base B. Each arm of the frame terminates in a yoke 109, 110 in which the respective receivers are pivoted on horizontal stub axles 111, 112; pivotal movement of 90° is effected by means of piston and cylinder actuators 113, 114 connected to cranks 115, 116 on the respective axles. Each arm also is provided with horizontal tracks 117, 118 on which an ejector carriage 119 is slidably mounted, the carriage being provided with an array of ejector pins 120 positioned to push the crayons out of the receiver when the carriage is advanced by operation of a torque cylinder 121.

The carrier is designed for reciprocation on its axle 105 through a 90° arc in order to bring the receivers 100 and 101 alternately in register with a compartment full of molded crayons, the receiver 100 being shown in that position in FIGS. 1, 2, 6 and 7. The carrier drive 122 is connected to and synchronized with the drive system DS for the mold table and other movable parts. When a receiver is above a mold compartment it must be in horizontal position, with its tubes vertical, to receive crayons as they are driven upward out of the mold tubes 19 by the ejector point stems 21. When the filled receiver 100 has been turned clear of the mold table, toward the position shown in broken lines at the top of FIG. 1, its actuator 113 rocks it 90° to a vertical position (like receiver 101 at the bottom of FIG. 1), so that the ejector pins 120 are in register with the receiver tubes when the pins are advanced to eject the crayons onto a conveyor, not shown.

While two receivers are shown, oscillating in a 90° arc, it will be recognized that the two receivers could be spaced 180° on a straight carrier frame, rotated around a central axis, or more than two receivers could be provided, with appropriate modification of their indexing to receive and discharge crayons.

Figure 8:
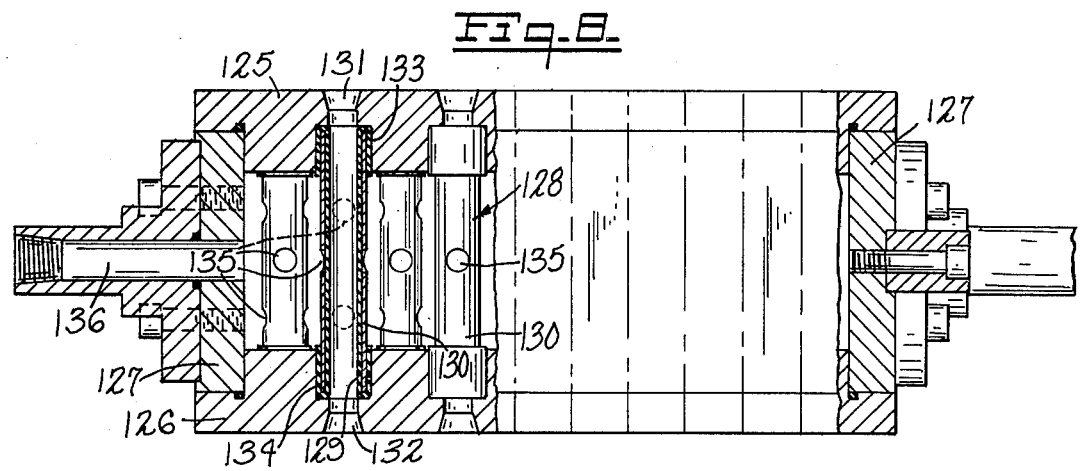
FIG. 8 is an enlarged vertical section taken along line 8—8 of FIG. 7.
Figure 9:
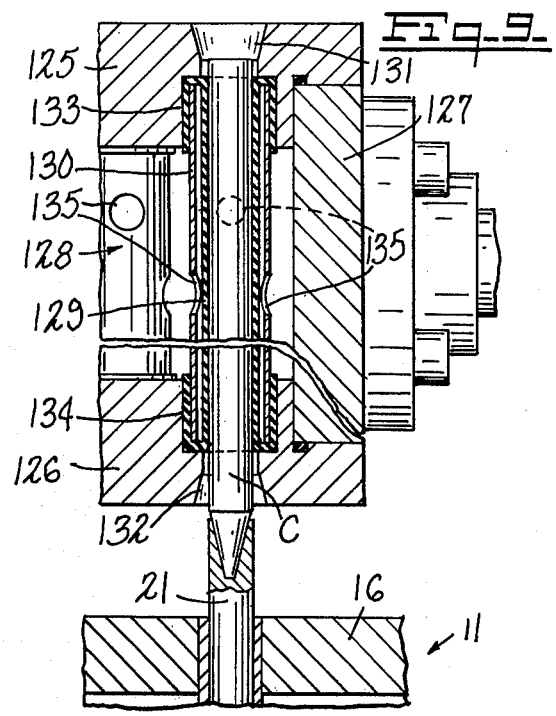
FIG. 9 is an enlarged sectional view of a single receiving unit, with the parts broken away.

Each receiver (FIGS. 7, 8 and 9) comprises a top plate 125 and a bottom plate 126, perforated in a manner to position properly the gripping tube assemblies, and four side walls 127, forming with the top and bottom plates an air tight box, as shown in FIG. 8. Each gripping tube assembly 128 consists of an elastic tube 129 of rubber-like material fitted loosely within a metal tube 130 and having its ends turned outward and pulled over the ends of the metal tube (FIGS. 8 and 9). The perforations 131, 132 in the top and bottom plates include enlarged portions 133, 134, in which the covered ends of the metal tubes fit air-tightly. Each metal tube 130 is provided with holes 135 so that each elastic tube is exposed to the air pressure within the receiver. The axle 111 is bored axially at 136 and connected to an air hose 137 for supplying air under pressure and permitting the exhaust of same.

In the operation of the receiver, a receiver 100 is located above a compartment 14, the tubes 18 of which are in register with the respective tube assemblies 128 (FIGS. 1, 2, 6 and 7). The ejector cylinder EC is actuated, raising the ejector points 21 to drive the molded crayons C (FIG. 9) into the tubes 129. When the crayons are at their top position, air is admitted from hose 137 through bore 136 to raise the pressure within the receiver and collapse the tubes 129 around their respective crayons, each crayon being held individually in a resilient grip which cannot nick, scratch or mar the crayon surface. The cross-sectional shape of the crayons—round, square, hexagon, etc.—is immaterial because the resilient tubes adapt adequately to any shape.

A receiver of the character described, or certain elements thereof, may be useful in other environments, for receiving and conveying various articles including those which might be easily broken or marred.

When the receiver 100 has been thus loaded, the carrier frame is rotated 90°, moving the receiver to the broken line position in FIG. 1, the receiver being rocked by actuator 113 to a vertical position, and torque cylinder 121 is operated to move ejector pins 120 against the ends of the crayons, as the air pressure in the receiver is reduced to free the crayons for ejection onto a suitable conveyor.

The drive system DS includes a motor M with suitable reduction gearing driving a main shaft 140 coupled to an indexer 141 which drives the mold table through a pinion gear 142 engaging the ring gear 143. The table is indexed in discrete steps of 20° in a time increment ($t$); for approximately $\frac{1}{2} t$ the table rotates and for the remaining $\frac{1}{2} t$ the table rests. The crayon carrier oscillator drive 122 is connected to the main shaft by means of a chain 144 and sprockets arranged to give a two to one reduction ratio. The carrier frame oscillates during the same time increments as the mold table advances. Another chain and sprocket drive connects the main shaft to a cam type programmer, not shown; this programmer is the "electro-mechanical intelligence" that is used to determine the sequence and duration of each function of operation, and its structural details are believed to be well within the skill of the art.

As previously noted, the machine could be adapted, in whole or in part, for the manufacture of candles (with wicking mechanism added) or for casting chalk sticks.

The method of operation may be summarized as follows:

The wax supply system WS is charged with a quantity of wax which is melted and made available to the three-way valve 31 for supply to the chute 33 as required.

The hot and chilled water sources are activated for supplying water to the heating and cooling system, as directed by the manifold valve 70.

The drive system DS is started and all the driven parts take up their respective functions, as programmed or as individually and/or automatically instigated, namely:

The compartments 14 are brought step-by-step under the chute 33 where the plate 16, containing the open upper ends of the tubes 18, is flooded with at least enough wax to fill each tube, the tubes being heated in this zone.

The mold table is rotated ($\frac{1}{2} t$ moving 20°, $\frac{1}{2} t$ dwell) to bring successive compartments into filling position and the filled tubes are moved from the heated zone into a longer zone where they are cooled to an increasingly low degree.

After leaving the cooling zone each compartment is scraped clean by the scraper 53, which also cuts off squarely the butt ends of the crayons, and excess wax is pushed by the paddle 61 into the remelt kettle 65, for return to the wax supply.

Upon reaching a position under the horizontally disposed receiver 100 the ejector assembly is raised by the ejector cylinder EC and its piston 25 and shoe 26 to drive the crayons into the respective receiver tubes 128, which are not pressurized and accomodate freely the crayons, of any shape. At the top of the ejection stroke the receiver is pressurized, causing the rubber tubes 129 to grip resiliently each of the crayons. The ejector drops to its inactive position.

The loaded receiver 100 is turned 90° to the broken line position of FIG. 1, bringing the receiver 101 into position to receive the next batch of crayons from the next compartment. The receiver 100 is rocked 90°, to a vertical position, air pressure is released, and the ejector 102 is actuated to push the crayons out of the receiver onto a conveyor, not shown. When the receiver 101 has been loaded, the removal system RS is returned to the position shown in FIG. 1, for repetition of this oscillatory sub-cycle, as long as the molding system continues to operate.

It will be understood that various changes may be made in the form, construction, arrangement and material of the several parts of the apparatus, and in the steps of the method, without departing from the spirit and scope of the invention, and it is accordingly intended that all matter contained in the above description or shown in the accompanying drawings shall be interpreted as illustrative and not in a limiting sense.

We claim:

1. In a molding machine, a horizontally rotatable mold table containing a plurality of compartments disposed in an annular array, a plurality of mold tubes traversing vertically each compartment, fluid supply and return conduit means connected to each compartment, and a fluid distributing manifold traversed by passages communicating with said conduit means, said fluid distributing manifold having a first portion rotatable with said mold table and a second portion which is fixed relative to said first portion, a plurality of pairs of heating and cooling fluid supply and return passages in said first manifold portion juxtaposed to the respective compartments, means connecting said fluid supply and return passages of each pair to the fluid supply and return conduit means, respectively, of different adjacent compartments, and transfer passages in said second manifold portion which are arranged for communication with said fluid supply and return passages for connecting each of certain paired ones of said fluid supply and return passages together.

2. In a molding machine according to claim 1, wherein means are provided for moving said mold table so as to displace each compartment sequentially through a heating and mold tube-filling zone, a cooling zone and an ejection zone.

3. In a molding machine according to claim 1, wherein said means connecting said fluid supply and return passages of each pair to the associated fluid supply and return conduit means are arranged to connect the return passage of each pair to the return conduit means of the compartment which is located next to and downstream, with respect to the direction of rotation of said mold table, from the compartment to the supply conduit means of which the supply passage of the same pair is connected.

4. In a molding machine according to claim 1, wherein means are provided for moving said mold table so as to displace each compartment sequentially through a heating and mold tube-filling zone, a cooling zone and an ejection zone, and means are provided for inhibiting any flow of fluid through any of said compartments which is, at any given rotational position of said mold table, juxtaposed to said ejection zone, such that no heating or cooling takes place in any compartment while fully molded articles are being ejected from the respective mold tubes thereof.

5. In a molding machine according to claim 4, wherein a source of heating fluid is provided and arranged to circulate said heating fluid through those of said compartments located at any given time in said heating and mold tube-filling zone, via the associated fluid supply passages, supply conduit means, return conduit means, return passages and transfer passages, in a direction countercurrent to the direction of movement of said mold table, and a source of cooling fluid is provided and arranged to circulate said cooling fluid through those of said compartments located at any given time in said cooling zone, via the associated fluid supply passages, supply conduit means, return conduit means, return passages and transfer passages, in a direction countercurrent to the direction of movement of said mold table.

6. In a molding machine according to claim 4, wherein said means for moving said mold table comprises means for effecting an intermittent table movement, thereby to cause each of said compartments to dwell for a specified time at least once in each of said zones.

7. In a molding machine according to claim 4, wherein said means connecting said fluid supply and return passages of each pair to the associated fluid supply and return conduit means are arranged to connect the return passage of each pair to the return conduit means of the compartment which is located next to and downstream, with respect to the direction of rotation of said mold table, from the compartment to the supply conduit means of which the supply passage of the same pair is connected.

8. In a molding machine according to claim 7, wherein said transfer passages are fewer in number than said compartments, and said flow inhibiting means is constituted by an imperforate section of said second manifold portion where the same is devoid of any transfer passages.

* * * * *

UNITED STATES PATENT AND TRADEMARK OFFICE
CERTIFICATE OF CORRECTION

PATENT NO. : 4,082,491
DATED : April 4, 1978
INVENTOR(S) : Wilbur L. Clymer et al.

It is certified that error appears in the above-identified patent and that said Letters Patent are hereby corrected as shown below:

Column 4, lines 2-4, for "and 74 are in register with a radial channel 83 in the annular bearing plate 84 a respective transfer passage in the form of the manifold member 72 (FIG. 3), thus" read --and 74 are in register with a respective transfer passage in the form of a radial channel 83 in the annular bearing plate 84 of the manifold member 72 (FIG. 3), thus--.

Signed and Sealed this

Tenth Day of October 1978

[SEAL]

Attest:

RUTH C. MASON
Attesting Officer

DONALD W. BANNER
Commissioner of Patents and Trademarks